(12) United States Patent
Krieger

(10) Patent No.: US 9,880,927 B2
(45) Date of Patent: Jan. 30, 2018

(54) FUNCTIONALLY EXPANDABLE VEHICLE CONTROL DEVICE AND METHOD FOR SUPPLEMENTING THE FUNCTIONALITY OF A VEHICLE CONTROL DEVICE

(71) Applicant: VOLKSWAGEN AG, Wolfsburg (DE)

(72) Inventor: Olaf Krieger, Lostau (DE)

(73) Assignee: Volkswagen AG, Wolfsburg (DE)

( * ) Notice: Subject to any disclaimer, the term of this patent is extended or adjusted under 35 U.S.C. 154(b) by 255 days.

(21) Appl. No.: 14/400,565

(22) PCT Filed: May 8, 2013

(86) PCT No.: PCT/EP2013/059663
§ 371 (c)(1),
(2) Date: Nov. 12, 2014

(87) PCT Pub. No.: WO2013/171122
PCT Pub. Date: Nov. 21, 2013

(65) Prior Publication Data
US 2015/0154113 A1  Jun. 4, 2015

(30) Foreign Application Priority Data
May 12, 2012  (DE) .................. 10 2012 009 482

(51) Int. Cl.
*G06F 12/02*   (2006.01)
*G06F 12/14*   (2006.01)
(Continued)

(52) U.S. Cl.
CPC .......... *G06F 12/0246* (2013.01); *G06F 8/665* (2013.01); *G06F 9/4881* (2013.01);
(Continued)

(58) Field of Classification Search
CPC .... G06F 8/65; G06F 11/1464; G06F 11/3013; G06F 8/60; G06F 8/665; G06F 11/1433
See application file for complete search history.

(56) References Cited

U.S. PATENT DOCUMENTS

| | | | |
|---|---|---|---|
| 7,376,945 B1 * | 5/2008 | Kakumani | G06F 8/67 717/171 |
| 8,490,074 B2 * | 7/2013 | Young | G06F 8/61 717/167 |

(Continued)

FOREIGN PATENT DOCUMENTS

| | | |
|---|---|---|
| CN | 102202940 A | 9/2011 |
| CN | 102262540 A | 11/2011 |

(Continued)

OTHER PUBLICATIONS

Fritsch, Serena, et al. "Time-bounded adaptation for automotive system software." Proceedings of the 30th international conference on Software engineering. ACM, 2008. Retrieved on [Sep. 21, 2017] Retrieved from the Internet: URL<http://dl.acm.org/citation.cfm?id=1368166>.*

(Continued)

*Primary Examiner* — Thuy Dao
*Assistant Examiner* — Cheneca Smith
(74) *Attorney, Agent, or Firm* — Barnes & Thornburg LLP

(57) ABSTRACT

A vehicle control device for supplementing/changing the functionality of a vehicle control device. A vehicle control device is created having at least one processor, a memory coupled to the processor, a plurality of application modules, and at least one communication interface for interchanging data with other vehicle control devices or an external vehicle device. Also disclosed is a method for supplementing/changing the functionality of a vehicle control device.

7 Claims, 1 Drawing Sheet

(51) Int. Cl.
*G06F 9/445* (2006.01)
*G06F 9/48* (2006.01)
*G06F 9/50* (2006.01)

(52) U.S. Cl.
CPC ........ *G06F 9/5016* (2013.01); *G06F 12/1433* (2013.01); *G06F 2212/1052* (2013.01); *G06F 2212/7201* (2013.01)

(56) References Cited

U.S. PATENT DOCUMENTS

| | | | | |
|---|---|---|---|---|
| 9,197,314 | B1* | 11/2015 | Lauer | H04B 7/18506 |
| 2003/0225929 | A1 | 12/2003 | Adams | |
| 2005/0050356 | A1* | 3/2005 | King | H04L 63/126 |
| | | | | 726/4 |
| 2005/0090941 | A1* | 4/2005 | Stefan | G07C 5/008 |
| | | | | 701/1 |
| 2005/0210034 | A1* | 9/2005 | Howard | G06F 8/65 |
| 2006/0010437 | A1* | 1/2006 | Marolia | G06F 8/65 |
| | | | | 717/168 |
| 2008/0126778 | A1* | 5/2008 | Bishop | G06F 8/65 |
| | | | | 713/2 |
| 2009/0007098 | A1* | 1/2009 | Chevrette | G06F 8/65 |
| | | | | 717/177 |
| 2009/0063120 | A1 | 3/2009 | Babinsky et al. | |
| 2009/0119657 | A1* | 5/2009 | Link, II | G06F 8/65 |
| | | | | 717/168 |
| 2009/0125897 | A1* | 5/2009 | Matlin | G06F 8/65 |
| | | | | 717/168 |
| 2010/0179720 | A1 | 7/2010 | Lin et al. | |
| 2011/0239210 | A1* | 9/2011 | Kotani | G06F 8/65 |
| | | | | 717/171 |

FOREIGN PATENT DOCUMENTS

| | | |
|---|---|---|
| DE | 10001130 A1 | 7/2000 |
| DE | 69432369 T2 | 12/2003 |
| DE | 102008036711 A1 | 2/2010 |
| DE | 102009018761 A1 | 10/2010 |
| EP | 0869417 A1 | 10/1998 |
| JP | H11296408 A | 10/1999 |

OTHER PUBLICATIONS

Yu et al."Recent advances in in-vehicle embedded systems." IECON 2011—37th Annual Conference on IEEE Industrial Electronics Society. IEEE, 2011.Retrieved on [Sep. 21, 2017] Retrieved from the Internet:URL<http://ieeexplore.ieee.org/document/6120072/#full-text-section>.*

Search Report for International Patent Application No. PCT/EP2013/059663; dated Nov. 28, 2013.

* cited by examiner

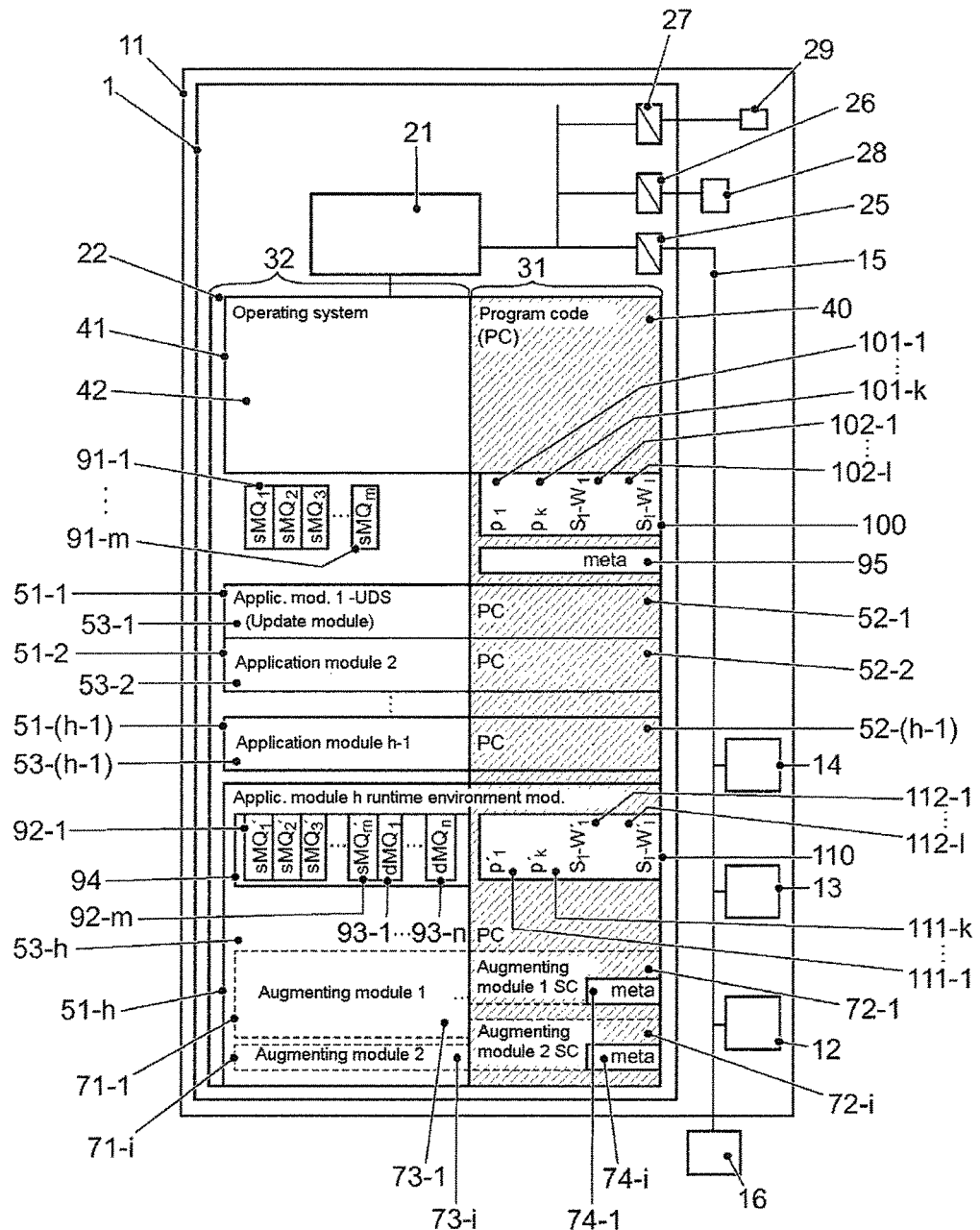

FUNCTIONALLY EXPANDABLE VEHICLE CONTROL DEVICE AND METHOD FOR SUPPLEMENTING THE FUNCTIONALITY OF A VEHICLE CONTROL DEVICE

PRIORITY CLAIM

This patent application is a U.S. National Phase of International Patent Application No. PCT/EP2013/059663, filed 8 May 2013, which claims priority to German Patent Application No. 10 2012 009 482.5, filed 12 May 2012, the disclosures of which are incorporated herein by reference in their entirety.

SUMMARY

Exemplary embodiments relate to a vehicle controller, the functionality of which can be subsequently altered, and to a method for augmenting the functionality of a vehicle controller.

Disclosed embodiments provide improved controllers in which functional expansion or change is possible following the production thereof and/or during operation and possible side effects as a result of the change in the functionality are limited at least in terms of the consequences of the change. Similarly, an improved method for augmenting the functionalities of a controller is provided.

BRIEF DESCRIPTION OF THE DRAWINGS

The invention is explained in more detail below with reference to a drawing, in which:

FIG. 1 shows a schematic illustration of a vehicle controller integrated in a vehicle.

DETAILED DESCRIPTION OF THE DISCLOSED EMBODIMENTS

Exemplary embodiments are based on the concept of programming the controller functionalities during production in one or more application modules that provide the functionalities that are desired at the time of design. In addition, a further software application is integrated into the controller, which software application provides a runtime environment for executing program codes. The application modules that provide the basic functionality at the time of the design of the controller, and that application module that provides the runtime environment, are realized in the controller such that they each have allocated static processor access times and static memory areas. Part of the basic functionality—realized in one of the application modules—of the controller is that it is possible to use a communication interface of the vehicle controller to transmit a program code from an augmenting module to the vehicle controller and to achieve storage of the program code from the augmenting module in a program memory area of the runtime environment module. The expanded functionality is therefore provided by the program code from the augmenting module that is executed in the runtime environment. The fact that the processor times allocated to the runtime environment module and to the other application modules are stipulated from the outset ensures that the functions realized during production of the controller, which are executed in the application modules, are each provided with sufficient processor access time to provide their functions. Furthermore, static separation of the memory areas precludes negative influencing of one of the application modules on the basis of memory that is not existent to a sufficient degree or on the basis of memory areas being overwritten. There is therefore no fear of functional impairment by the augmenting modules. Only the program codes from different augmenting modules that are executed in the runtime environment can influence one another disadvantageously in this respect. Side effects are therefore limited exclusively to the augmenting modules.

In particular, a vehicle controller is proposed that comprises at least one processor, a memory coupled to the processor, wherein the memory stores program codes from an operating system that are able to be executed on the processor and a plurality of application modules that provide the functionalities of the controller, and at least one communication interface for data interchange with other vehicle controllers or with an external device, wherein the application modules each have the program and data memory areas of the memory that are needed for their respective execution statically associated with them, and wherein the operating system is designed to allow the individual application modules access to the processor at previously statically stipulated intervals of time for the purpose of executing their program code, wherein one of the plurality of application modules is an update module to use the at least one communication interface to receive program code from one or more augmenting modules and to store it in the memory to prompt an expansion and/or change in the functionality of the vehicle controller, wherein one of the plurality of application modules is a runtime environment module that provides a runtime environment to execute the program code of the one or more augmenting modules, and the update module is designed to store the program code of the augmenting module(s) in the program memory areas associated with the runtime environment module, wherein the runtime environment module is designed to split the data memory area allocated to it and the processor access time available to it dynamically at runtime to execute the program code of the one or more augmenting modules.

In addition, a method for augmenting the functionality of a vehicle controller as described above is provided that comprises the steps of: provision or production of a program code for an augmenting module that, when executed, prompts a new or altered functionality of the vehicle controller, setup of a communication link to the update module of the vehicle controller via the at least one communication interface, transmission of the program code of the augmenting module to the vehicle controller and storage of the program code in a program memory area allocated to the runtime environment module, as a result of which the runtime environment module executes the program code of the augmenting module.

An expansion made at a later time as an augmenting module does not, when the expansion is produced, need to know the specific form of a controller or of the controllers on which the augmenting module is intended to be executed. This relates primarily to the processor derivative used, the number of processor cores and the memory layout of the controller. The expansion is therefore implemented in a platform-independent form as program code or script code for an augmenting module, which code is executed in the controller by the runtime environment.

To be able to adapt the functions realized in the controller to suit a specific vehicle or to suit specific vehicle controller combinations, it is standard practice to use a nonvolatile memory area to store parameters that influence the provided functionalities.

In at least one disclosed embodiment, provision is made for the memory to comprise a nonvolatile area that stores or can be used to store parameters for the application modules, wherein one of the application modules provides a functionality that permits the parameters to be read and/or replaced by means of communication using the at least one communication interface, and wherein parameters for augmenting modules are stored in the parameter memory as key value pairs. Use of a format of a key value pair is therefore advantageous, since the number of parameters needed for the individual augmenting modules and the format of the parameters are not known in advance. However, the key can be used to easily and reliably identify the respective parameter needed and to find the corresponding associated parameter value. The memory area in which the parameters are mapped, or at least the memory area that stores the key parameter value pairs, may be mirrored in the statically allocated memory area that is associated with the runtime environment module. Hence, the augmenting modules can access the parameter values without direct access to memory areas taking place at the operating system level of the controller.

In principle, the use of memory areas by a plurality of application modules carries the risk of unintended effects arising. Although the use of statically allocated memory areas allows communication between different application modules or different program code strands to be realized by the latter accessing a shared memory area, this communication is reliable only if there is the assurance that, by way of example, values written by one program code strand are read by the other program code strand before the first program code strand updates the values again. Since communication between the application modules and the augmenting modules is not intended to be realized in this manner to avoid side effects that are not intended, at least one disclosed embodiment provides for the communication structure in the controller to be statically stipulated at the time of production of the vehicle controller and for the communication structure to comprise what are known as message queues that at least the runtime environment module can use to interchange data with the remainder of the application modules. At the actual time of production of the vehicle controller, the interfaces and functions or functionalities are stipulated that possibly later added augmenting modules are meant to be able to use. For the data interchange that is required to call functions or to access provided interfaces, for example, static message queues are therefore provided at operating system level, which allows the augmenting modules to be linked to the application modules later. An advantage of realizing intermodule communication, i.e. communication between different application modules, using message queues is that data interchange can take place asynchronously. The data to be interchanged are stored in a defined message queue by one application and read from the message queue at another time by another application. The latter can then in turn store data in the same or another message queue to transmit data back to the first process. The application modules may also use static message queues for intermodule communication.

To allow communication between the different augmenting modules too, it is advantageous if the runtime environment module provides a message queue manager in its runtime environment, the message queue manager providing static runtime environment message queues that are mapped onto the static message queues of the operating systems and allow the augmenting modules to communicate with the remainder of the application modules by this means and permitting dynamic message queues to be formed at runtime to allow communication between the augmenting modules. The message queue manager of the runtime environment must therefore also permit and manage dynamic message queues, since there is no advance knowledge of what data interchange might be necessary between the individual augmenting modules.

Particularly simple and—in terms of resource use—economical implementation of a runtime environment module comprises a virtual machine that is a stack machine. The program code of the augmenting modules needs to be implemented therefor such that the virtual machine can interpret the program code and convert it into machine commands for the processor that is actually existent. The specific memory allocation is likewise performed by the virtual machine in the case of this implementation, as a result of which no absolute memory addresses are used for the implementation of the augmenting modules. This achieves the effect for the augmenting modules that they can be programmed independently of the hardware that is actually existent. However, it is necessary to know the individual functions and interfaces that are provided by the application modules and that the augmenting modules can access by means of communication using the provided message queues.

To ensure that an augmenting module can actually be executed on a controller, at least one disclosed embodiment provides for the augmenting module to have metadata added to it that comprise at least requirement information about resources needed for execution, and for the metadata to be transmitted to the vehicle controller prior to transmission of the program code or with the program code, and for the update module, that module that allows installation of augmenting modules in the controller, to use the metadata to check whether the vehicle controller meets the requirements for the resources that are needed, and, if this is the case, to store the program data in the program data memory area of the runtime environment module or otherwise, if the requirements in respect of the resources needed are not met, to terminate transmission of the program data from the augmenting module, reject the transmission, discard the transmission or erase already stored program data from the memory again. The resources needed by an augmenting module primarily include: requisite memory, requisite processor time, communication interfaces to other application or augmenting modules. By checking the metadata, it is possible to ensure that a controller is not incorrectly used to store and execute program data from an augmenting module that cause errors therein upon execution. This could possibly likewise hamper correct execution of other augmenting modules executed in the runtime environment. A method for changing or augmenting the functionality of a vehicle controller may provide for such a check on the metadata or, in general terms, a resource check.

In a further disclosed embodiment, the program code and the metadata from an augmenting module are secured by a cryptographic hash function that is known to the update module, so that inadvertent alterations and attendant inconsistencies between the description of the functionality in the metadata and the actual implementation in the program code can be recognized by the update module. The update module can then remove the corrupt augmenting module again and/or prevent or terminate the installation thereof.

In a further disclosed embodiment, the program code, the metadata and the value of the hash function are additionally signed by a digital signature as known from the prior art. This allows the update module to check whether the augmenting module has been produced by a trustworthy source and that no manipulation of the program code of the augmenting module has taken place.

To expand the functions of a vehicle controller, in some cases there is not just a need for communication with application modules of the vehicle's own controller, but also communication with application modules of other controllers and/or communication with other augmenting modules on other vehicle controllers of the vehicle is/are advantageous.

The controllers in vehicles are usually connected to one another by means of bus systems, in particular serial bus systems. The most widely used are what are known as CAN busy systems and Flexray bus systems. These are different bus systems equipped with a standardized transmission protocol. While the individual messages sent have an identifier that denotes the content thereof in CAN bus systems, the time available for message transmission is divided into cycles on a Flexray bus system. In each cycle, there is a time period in which time windows, what are known as slots, are statically associated with individual communication nodes. Furthermore, a cycle comprises a dynamic section in which the different communication subscribers are able to transmit messages of variable length in a manner prioritized on the basis of the identification associated with the communication subscribers.

In addition, the individual controllers are usually designed such that an application that controls the communication interface filters the messages arriving on the communication interface in respect of their identifier. Thus, only the messages that contain information that one of the application modules of the vehicle controller actually evaluates are supplied to these applications for the processing thereof. Other messages are filtered and discarded right at the input. This allows a reduction in the storage capacity that is required for buffer-storing the messages and in a processing complexity in the individual application modules.

In the event of expansion of the functionality, to provide the augmenting modules with the possibility of sending messages to other vehicle controllers and hence to other application modules and/or augmenting modules in other vehicle controllers or evaluating messages therefrom, at least one disclosed embodiment provides for the actual production of the vehicle controller to involve the reservation of one or more message identifiers for messages from augmenting modules that are used by the controller to send information from augmenting modules or to transmit information thereto.

In one disclosed embodiment, the communication interface is a message-based interface and the individual vehicle controllers have associated communication identifiers, and at least one communication identifier, optionally a group of communication identifiers, are reserved so that messages can be transmitted and received to and from augmenting modules of the vehicle controller. The communication identifiers can be used in the CAN bus as message identifiers. In Flexray bus systems, the communication identifier can be used as an ID.

FIG. 1 schematically shows a motor vehicle 1 schematically with a plurality of controllers 11-14 situated therein. The controllers 11-14 are connected to one another for communication purposes via a bus 15. In addition, the bus 15 has a vehicle-external tester 16 connected to it that can used to perform diagnosis and servicing work on the controllers 11-14 of the motor vehicle 1. In normal driving mode, the tester 16 is naturally not connected to the motor vehicle 1.

Of the controllers 11-14, the total number of which in the vehicles can vary, one of the controllers 11 is shown in enlarged form by way of example in this case. The other controllers 12-14 may be of similar design in terms of structure.

The controller 11, which is provided so as to be able to have its functionality subsequently altered and/or expanded, comprises a processor unit 21 and a memory 22 coupled thereto. In addition, the controller 11 comprises a communication interface 25 that allows access to the vehicle bus 15. In addition, the controller has further interfaces 26, 27 that are connected to sensors 28, 29. Instead of the sensors 28, 29, it is also possible for actuators, actuating elements or the like to be connected to the controller via interfaces. The number of interfaces that are existent is dependent on the function or the functions that the controller performs in a vehicle.

The memory 22 usually comprises a program memory area 31 and a data memory area 32. These may be designed using different or the same hardware, even in the same memory module. In any case, the program memory area 31 does not have to be a nonvolatile memory. A prerequisite for the data memory is that it is suitable as a read and write memory. By way of example, it is possible to use flash memories or EEPROM memories. However, the data memories used may also be memory chips that provide volatile memories, as are known to a person skilled in the art.

The memory 22 stores a program code 40 for an operating system 41. The operating system has a statically associated data or main memory 42 that is needed for execution thereof. In addition, memory areas for application modules, for example for h application modules in the examples shown, are reserved and statically allocated in the memory 22. Each of the application modules 51-1 to 51-$h$ comprises program codes 52-1 to 52-$h$ that are stored in the program memory 31 of the memory 22. Furthermore, each application module likewise has an allocated area of the data memory 53-1 to 53-$h$ that the relevant application module requires as data and main memory for providing its functionality. The fact that each application module 51-1 to 51-$h$ has precisely the required amount of memory made available to it ensures that a resource bottleneck does not arise when all the application modules are executed. Side effects such as competitive conditions for resources, e.g. memory areas, are precluded from the outset. In such an exemplary embodiment, the operating system can also be considered to be an almost equivalent application module that undertakes the function of distributing particularly the computation time of a processor 21 between the individual application modules 51-1 to 51-$h$.

The individual application modules 51-1 to 51-$h$ have statically allocated fixed access times for the processor 21. This makes it possible to ensure that each application module 51-1 to 51-$h$ is provided with the requisite processor time to perform its functionality. Between the individual application modules 51-1 to 51-$h$, what is known as intermodule communication can be realized at a very high level of performance through the use of shared memory areas. This is also possible with static allocation by virtue of different application modules being allocated the same memory areas that are used for intermodule communication. Furthermore, the application modules 51-1 to 51-$h$ can interact with one another by virtue of function calls being permitted, this being a simple matter for the different application modules 51-1 to 51-$h$ on account of the fixed memory allocation. However, such an approach has the disadvantage that the processor time allocated to an application is extended overall when a function of another module is called. This can result in a function of one application module not being "ready in time" when it calls a function from another application module. This method of intermodule communication can be used only if there is precise knowledge of the additional execution time at the time of development and the additional execution time can be taken into account when allocating the requisite process time.

Intermodule communication may be executed using what are known as message queues, which are provided statically. These are memory areas that are used to store data to be interchanged are messages in a queue. Other processes can then asynchronously fetch and process data stored therein and can themselves store results as a new message in the same or another message queue. Although such intermodule communication can, in worst cases in which the messages are not fetched from the message queue in time, result in overflow of the message queue, this does not adversely affect the sending process, i.e. the process storing the messages. The transmitter and the receiver each use a separate copy of the interchanged data, which means that disadvantageous reciprocal influencing as a result of inconsistent joint access to the same memory is avoided.

While expansion of a functionality for a controller required modification of the program code of one of the application modules, or required the addition of program codes from a new application module, in the case of controllers based on a prior art, the exemplary embodiment of the controller that is described in the present case involves another realization being proposed. At the time of production of the controller, the originally existent application modules are stipulated and the memory areas required by the controller are allocated to the application modules. In addition, the respective requisite processor time is ascertained and is allocated to the application modules statically. Remaining resources in respect of the existent memory and in respect of existent processor time are statically allocated to one application module, which is called runtime environment module 61, 51-*h* in the present case. This runtime environment module 61 is in a form such that it can interpret the program code 72-1 to 72-*i*, usually a script code (SC), and can convert it into machine commands for the existent processor and thereby execute the augmenting modules 71-1 to 71-*i*. A substantial advantage of such an approach is that the functionalities for which a provision is originally made in the controller 11, which are provided by the application modules 51-1 to 51-*h*-1, are almost uninfluenced by execution of augmenting modules 71-1 to 71-*i*. The augmenting modules 71-1 to 71-*i* can neither access memory areas of the application modules 51-1 to 51-*h*-1 nor adversely affect the processor time thereof that is statically allocated to each of them for execution. Execution of the augmenting modules 71-1 to 71-*i*, i.e. of the program codes 72-1 to 72-*i* of the respective augmenting modules 71-1 to 71-*i*, takes place only in the processor time that is allocated to the runtime environment module 61.

While the application modules 51-1 to 51-*h*, including the runtime environment module 51-*h*, 61, are granted direct access to the processor at the respectively stipulated access times, the execution time provided for the execution of each of the augmenting modules 71-1 to 71-*i* is stipulated dynamically by the runtime environment. The latter interprets the code and executes it in the runtime environment. The data memory 73-1 to 73-*i* used by each of the individual augmenting modules 71-1 to 71-*i* is also allocated to each of the individual augmenting modules 71-1 to 71-*i* dynamically at the time of execution of the respective modules. This allows improved resource consumption to be realized. For this, it is possible to use only memory that is statically allocated to the runtime environment module.

The application modules 51-1 to 51-*h* may be in a form such that the modules communicate with one another using static message queues (sMqj) 91-1 to 91-*m* with one another. To provide the augmenting modules with the opportunity to be able to access functions or interfaces that provide the application modules 51-1 to 51-*h*-1, including access to the data bus 15, it is necessary for the communication objects required therefor to be defined and provided during the design of the controller.

For intermodule communication between the augmenting modules 71-1 to 71-*i* and for communication with the processes of the application modules 51-1 to 51-*h*-1, what is known as a message bridge 94 is realized in the runtime environment of the runtime environment module 61, 51-*h*. This provides an opportunity for the augmenting modules 71-1 to 71-*i* to access the static message queues 91-1 to 91-*m* by virtue of the latter being inserted 92-1 to 92-*m* into the data memory area 53-*h* of the runtime environment module 61, 51-*h*. In addition, the augmenting modules 71-1 to 71-*i* can produce and use dynamic message queues 93-1 to 93-*n* for communication among one another.

In addition, both the processes of the application modules 51-1 to 51-*h* and the augmenting modules 71-1 to 71-*i* can define parameters that influence the execution thereof and can be read and/or altered by the external texter 16. While the parameters for the application modules are stipulated in respect of type and value range during the actual production of the controller, only the memory areas that store the parameter value 101-1 to 101-*h* need to be defined and statically allocated to these parameters. These parameters are therefore stored in a parameter memory 100 that is stored in the nonvolatile memory area, which can also be used as a program memory area 31, of the memory 22. Furthermore, the parameter memory 100 can be used to store the parameters for the augmenting modules. These may be stored as key value pairs (key value storage) 102-1 to 102-*l*. A key value pair has a respective key that explicitly characterizes the parameter and additionally a value and possibly a type of the parameter. Even if it is not known at what memory location the key value pair is stored, the key can be used to find the relevant parameter value, as a result of which it can be used by the relevant augmenting module 71-1 to 71-*i*. Since access by the augmenting modules 71-1 to 71-*i* to memory areas that are not statically allocated to the runtime environment module 61, 51-*h* is not permitted, the parameter value memory 100 is mapped to the memory of the runtime environment module 61, optionally to the nonvolatile memory area. The latter therefore contains a copy 110 of the parameter value memory 100, which contains the copied parameter values 111-1 to 111-*k* and the key value pairs 112-1 to 112-*l* as copies. Alternatively, one of the augmenting modules 71-1 to 71-*i* can also instruct the runtime environment 61 to access the parameter memory 100 and to deliver values to the augmenting module 71-1 to 71-*i*.

To integrate a new augmenting module into the controller 11 for the purpose of expanding the functionality or changing the functionality thereof, one of the application modules 51-1 to 51-*h*-1 is known as an update module 62. This functionality is frequently provided by an application module that also provides what are known as unified diagnostic services. This application module 51-1, 62 provides the functionality that the tester 16 can be used to prompt program code 72-1 to 72-*i* transmitted to the controller 11 from an augmenting module 71-1 to 71-i to be installed into the nonvolatile program memory 52-h of the runtime environment module 61, 51-h.

In at least one disclosed embodiment, there is provision for the augmenting modules 71-1 to 71-i each to be assigned meter information 74-1 to 74-i that indicates the requisite resources, for example requisite communication objects, memory requirement, processor power, etc.

The controller 11 contains a metadata memory 95 that is used to store the associated resources existent in the controller 11 (e.g. available memory 52h, 53h, unused processor time, available message queues). During the process of installing a new augmenting module 71-1 to 71-i, the update module 51-1, 62 uses the transmitted metadata 74-1 to 74-i of the augmenting module 71-1 to 71-i to check whether the augmenting module will be executable in the controller. If the outcome of the check is positive, the program code 72-1 to 72-i of the augmenting module 71-1 to 71-i is installed in the program memory 52-h of the runtime environment module 61. Otherwise, download of the program code 72-1 to 72-i is terminated, rejected or storage of program code data that has already taken place is reversed by erasing the relevant program code 72-1 to 72-i. The metadata 74-1 to 74-i enclosed with the augmenting module 71-1 to 71-i is used to augment the metadata memory 95 with those resources, e.g. new message queues, that the relevant augmenting module 71-1 to 71-i provides. The unused resources that are still available are reduced in the same step.

The controller described and the method for updating therefore allow simple adaptation of the functionality of a vehicle controller 11 and at the same time ensure that the functionality already provided in the original application modules 51-1 to 51-h is not adversely affected by the augmenting modules 71-1 to 71-i. The application modules 51-1 to 51-h are already oriented during the original design such that they provide the necessary communication objects (e.g. message queues), which means that augmenting modules 71-1 to 71-i can subsequently interact with them. To allow communication with other controllers 12-14 too, it is advantageous if the design stage already involves message identifiers being reserved and kept for possible augmenting modules 71-1 to 71-i added in future or a mechanism being provided for using the augmenting modules 71-1 to 71-i to be able to notify a bus interface 16 of which messages are needed by the relevant augmenting module 71-1 to 71-i for the operation thereof.

It goes without saying that only exemplary embodiments are described.

Modern vehicles, in particular modern motor vehicles, comprise one or more vehicle controllers that provide individual functionalities for regulating, controlling or diagnosing vehicle components. In this context, the scope of functions provided by a controller is stipulated when the respective controller is developed. In this case, the functions are frequently reliant on signals or information from particular sensors or other controllers to provide their specific functionality. Frequently, however, new vehicle variants need to be provided in the course of mass production that have an expanded scope of functions or that need to be fitted with controller combinations and models that differ from the original model. In such situations, it is desirable to be able to adapt a controller for which development is already complete and not to require complete redevelopment.

EP 0 869 417 B1 is concerned with this problem. It describes a vehicle control unit for controlling a vehicle with sensors for determining an operating state of the vehicle and the vehicle device with control actuating elements for controlling the vehicle on the basis of the sensor signals, the vehicle control unit comprising a single-chip microcomputer with a first memory, which stores a program for controlling the actuating elements, and comprising a CPU, which performs the calculation of the program. Provision is made for the program to contain an application software program for controlling the vehicle device and an interface software program. The CPU is designed to execute the application software program and the interface software program. The single-chip microcomputer comprises a second memory for storing data, for example the result of the processing of the application software. The program stored in the first memory is designed such that the interface software program can be changed independently of the application software program in accordance with the vehicle type changes, so that the application software program can be used jointly for various vehicle types without change and only changes in the interface software program from vehicle to vehicle are necessary.

DE 10 2009 018 761 A1 describes a method for updating at least one software component of a motor vehicle and allows a software component to be replaced only with the collaboration of the driver.

US 2010/0179720 A1 is also concerned with a system and a method for performing servicing and repair on a vehicle. It describes a system in which portions of a program code from a piece of software are augmented or replaced by patches, for example.

DE 10 2008 036 711 A1 proposes performing software-based vehicle functions of a motor vehicle using a piece of replacement, expansion and/or enabling software, with an already existent piece of vehicle-specific software being at least to some extent replaced, expanded or enabled by the replacement, expansion and/or enabling software. The replacement, expansion and/or enabling software is downloaded from a provider-end server via an online connection by means of a device integrated in the motor vehicle.

All the known methods assume that at least a portion of the existing program code is replaced or modified. Such changes entail high risks, however, since side effects of such changes on other software components of the controller can be assessed only to a limited extent. Therefore, a level of complexity for the verification and validation of such software changes is enormously high and comparable with the level of complexity for validating a complete software redevelopment.

LIST OF REFERENCE SYMBOLS

1 Motor vehicle
11-14 Controllers
15 Bus
16 Tester
21 Processor (CPU)
22 Memory
25 Communication interface
26, 27 Interfaces
28, 29 Sensors
31 Program memory area
32 Data memory area
40 Program code of the operating system
41 Operating system of the controller
42 Main memory
51-1-51-h Application modules
52-1-52-h Program code of the application modules
53-1-53-h Data memory of the application modules
61 Runtime environment module 62 Update module
71-1-71-*i* Augmenting modules
72-1-72-*i* Program code of the augmenting modules
73-1-73-*i* Data memory/main memory of the augmenting modules
74-1-74-*i* Metadata of the augmenting modules
91-1-91-*m* Static message queues
92-1-92-*m* Mapped (copied) static message queues
93-1-93-*n* Dynamic message queues
94 Message bridge
95 Metadata memory
100 Parameter memory
101-1-101-*k* Parameter value
102-1-102-*l* Key value pairs
110 Parameter memory copy
111-1-111-*k* Parameter value copy
112-1-112-*l* Key value pair copy

The invention claimed is:

1. A method for augmenting the functionality of a vehicle controller, comprising:
providing or producing a program code for an augmenting module that, when executed, prompts a new or altered functionality of the vehicle controller;
setting up a communication link to an update module of the vehicle controller via at least one communication interface;
transmitting the program code of the augmenting module to the vehicle controller; and
storing the program code in a program memory area allocated to a runtime environment module, as a result of which the runtime environment module executes the program code of the augmenting module,
wherein the program code of the augmenting module has metadata added to the program code that comprises at least requirement information about resources needed for execution, the metadata are transmitted to the vehicle controller prior to transmission of the program code or with the program code, the update module uses the metadata to check whether the vehicle controller meets the requirement for the resources that are needed, and metadata that, when the vehicle controller does not meet the requirement for the resources that are needed, terminates transmission of the program data from the augmenting module, rejects said transmission, discards said transmission or erases said transmission from the memory again; and
providing or producing program code for a plurality of augmenting modules,
wherein the runtime environment module is designed to dynamically split the data memory area allocated to the runtime environment module and the processor access time available to the runtime environment module at runtime to execute the program code of the augmenting modules.

2. A vehicle controller, comprising:
at least one processor;
a memory coupled to the processor, wherein the memory stores program codes from an operating system that are able to be executed on the processor;
a plurality of application modules that provide functionalities of the vehicle controller; and
at least one communication interface for data interchange with other vehicle controllers or with an external vehicle device,
wherein the application modules each have the program and data memory areas of the memory that are needed for their respective execution statically associated with them, and
wherein the operating system is designed to enable the individual application modules to access the processor at previously statically stipulated intervals of time for the purpose of executing their program code,
wherein one of the plurality of application modules is an update module enabling the at least one communication interface to receive program code from augmenting modules and to store the received program code in the memory to prompt an expansion and/or change in functionality of the vehicle controller,
wherein one of the plurality of application modules is a runtime environment module that provides a runtime environment to execute the program code of the augmenting modules,
wherein the update module is designed to store the program code of the augmenting modules in the program memory associated with the runtime environment module, and
wherein the runtime environment module is designed to dynamically split the data memory area allocated to the runtime environment module and the processor access time available to the runtime environment module at runtime to execute the program code of the augmenting modules.

3. The vehicle controller of claim 2, wherein the memory comprises a nonvolatile parameter memory to store parameters for the plurality of application modules, wherein one of the plurality of application modules provides a functionality that permits the parameters to be read and/or set by communication using the at least one communication interface, and wherein parameters for augmenting modules are stored in the parameter memory in the form of key value pairs.

4. The vehicle controller of claim 2, wherein the communication structure in the controller is statically stipulated at the time of production of the vehicle controller, said communication structure comprising message queues that the runtime environment module uses to interchange data with the remainder of the application modules.

5. The vehicle controller of claim 4, wherein the runtime environment module provides a message queue manager in the runtime environment, said message queue manager providing static runtime environment message queues that are mapped onto the static message queues of the operating system level and enable the augmenting modules to communicate with the remainder of the application modules and permitting dynamic message queues to be formed at runtime to allow communication between the augmenting modules.

6. The vehicle controller of claim 2, wherein the runtime environment module comprises a virtual machine in a stack machine.

7. The vehicle controller of claim 2, wherein the communication interface is as a message-based interface and the individual vehicle controllers have associated communication identifiers, and at least one communication identifier is stipulated that is provided for communication by or with an augmenting module.

* * * * *